May 17, 1955   G. F. ZIFFER   2,708,721
LIQUID LEVEL GAUGE
Filed Aug. 21, 1953
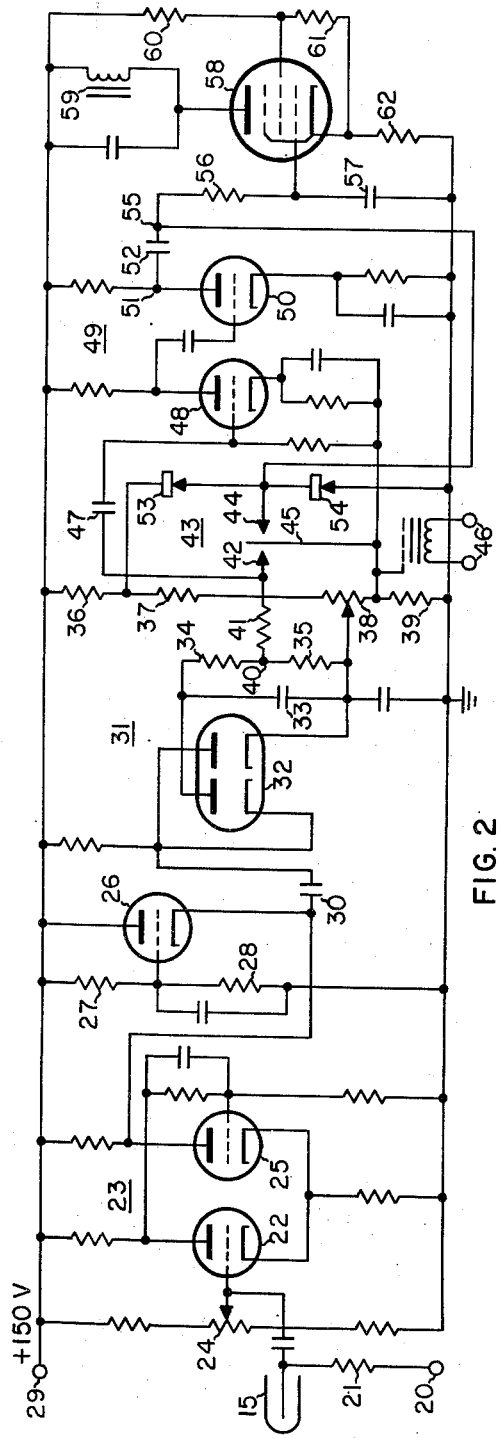
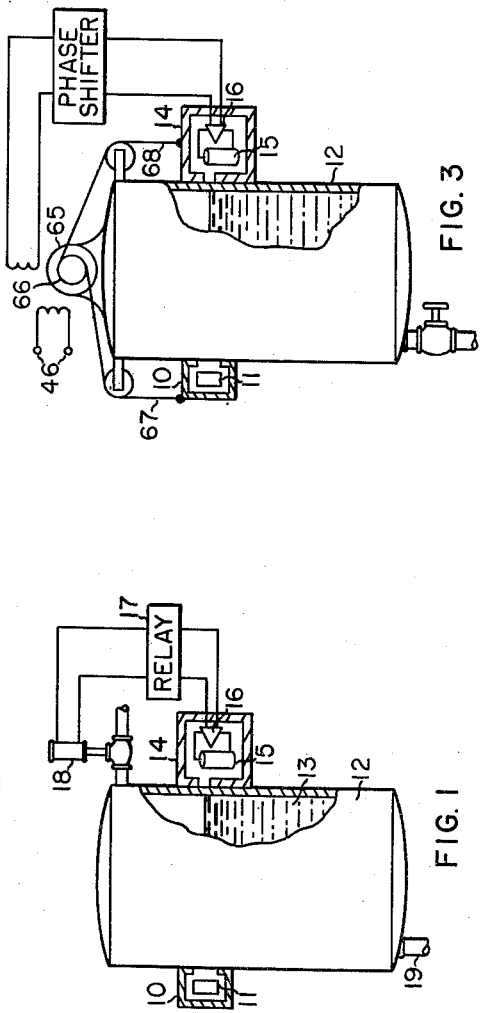
INVENTOR
Garret F. Ziffer
BY
*Spencer E. Olson*
ATTORNEY United States Patent Office 2,708,721
Patented May 17, 1955

2,708,721

LIQUID LEVEL GAUGE

Garret F. Ziffer, Cambridge, Mass., assignor to Tracerlab, Inc., Boston, Mass., a corporation of Massachusetts Application August 21, 1953, Serial No. 375,594

14 Claims. (Cl. 250—43.5)

This invention relates to an apparatus for indicating and controlling the level of a liquid in an opaque container, and more particularly to a circuit operative in response to the output of a radiation detector for accurately controlling the position of the level of a liquid.

In United States Letters Patent No. 2,323,128, granted June 29, 1943, to D. G. C. Hare, a method and an apparatus are disclosed by means of which the level of a liquid within a container can be determined without the necessity of access to the inside of the container. In accordance with the Hare patent, a beam of penetrative radiation is directed into or through the container to a detector arranged diametrically opposite from the source of radiation for indicating the amount of radiation transmitted through the container and its contents. Since there is a comparatively large amount of liquid between the source and detector, there is a definite and easily detectable change in the amount of transmitted radiation when the liquid level moves from a position below the path of the radiation to a position where the beam of radiation must pass through the liquid. Likewise, considering the liquid level fixed, there is an easily detectable change in transmitted radiation when the source and detector are moved vertically together from a position such that the beam of radiation must pass through the liquid to a position above the liquid where the beam will pass through a gas or a vapor. The information thus detected may be used to indicate the level of the liquid, or the output of the detector after suitable amplification, may be used to actuate a relay, which in turn, controls a valve for adding liquid to or draining liquid from the container as the liquid departs from the desired level.

The principal object of the present invention is to provide a circuit for use with liquid level apparatus of the type described that will respond to very small changes in level of the liquid.

A further object of the invention is to provide a circuit sensitive to the direction of change of the level of the liquid.

Another object of the invention is to provide a circuit having a minimum of hysteresis; i. e. a circuit wherein a relay is actuated in one direction as soon as the level of the liquid falls a small amount below a preset value and is reversed as soon as the level exceeds the preset value by a small amount.

Another object of the invention is to provide a circuit of the type described which is adaptable to a variety of conditions of source strength and container size. That is, the circuit is operative over a wide range of counting rates, which is a function of source strength, diameter of the container, thickness of the container walls, and density of the liquid whose level is controlled.

A more general object of the invention is to provide a bidirectional amplitude comparator of two direct current voltages, one of which may vary in amplitude and polarity relative to the other.

In the attainment of the foregoing objects, the pulse output of the detector is transformed into a direct current voltage signal, the amplitude of which varies with the radiation intensity. This direct current voltage is added algebraically to a manually adjustable direct current reference voltage, and the resultant voltage applied across a vibrator or chopper. At the preset liquid level, the reference voltage is adjusted to such a value that the resultant voltage is equal to zero, and as the liquid level rises, with an attendant decrease in counting rate, the magnitude of the signal changes resulting in the application of a resultant voltage of one polarity to the vibrator. The vibrator functions to change this resultant voltage to a square wave having a frequency determined by the driving frequency of the vibrator. As the liquid level drops, the counting rate increases, causing a resultant voltage of the opposite polarity to be applied to the vibrator which functions to produce a square wave 180° out of phase with the one resulting from a decrease in counting rate. The square waves thus generated are amplified by an alternating current amplifier, the output of which is periodically clamped by the vibrator. The phasing of the vibrator and amplifier are such that the resultant direct current component of the amplified and clamped square wave is of a polarity opposite to the input to the vibrator. This direct current component is filtered and applied to a tube which controls the operation of a relay. The circuit parameters are so chosen that a change in the amplitude of the input voltage of less than a millivolt in either direction changes the condition of the relay, with the result that the relay operates at almost exactly the same level whether the liquid is rising or falling.

Other objects, features and advantages of the invention will become apparent from the following detailed description taken in connection with the accompanying drawing in which:

Fig. 1 is a vertical elevation, partly in section, showing an apparatus for controlling the level of a liquid;

Fig. 2 is a circuit diagram of the present invention; and

Fig. 3 is a vertical elevation, partly in section, showing a level-seeking apparatus embodying the present invention.

Referring to the drawing, and more particularly to Fig. 1, a housing 10 containing a source 11 of penetrative radiation, such as gamma rays, is mounted at or near the outer surface of a container 12 containing a liquid 13, the liquid level of which it is desired to control. Another housing 14 is mounted on the outer surface of the container 12, preferably opposite from the housing 10, such that radiation from the source 11 will pass horizontally through a portion of the contents of the container to a detector 15 disposed within the housing 14. The detector is coupled to a circuit represented at 16, which may include a preamplifier and the circuit of the present invention. While circuit 16 is illustrated as being enclosed in housing 14, it will be understood that the preamplifier only may be located in the housing and the present circuit located remotely from the detector and connected to the preamplifier by a suitable cable. In operation, radiation from source 11 passes through the container, and the output signal of circuit 16, which varies with changes in liquid level, is utilized to operate a relay 17, which in turn may actuate a solenoid-controlled valve 18 to add liquid to the container when the level falls below the preset level upon the drawing off of liquid through outlet 19.

Referring to Fig. 2, the radiation from source 11 (Fig. 1) is detected by detector 15, preferably a radiation counter of the Geiger tube type having a grounded cathode and a center wire energized from a suitable source of high voltage at terminal 20 through a large resistor 21. The counter is illustrated as being of the self-quenching type, but may be of the type requiring an external quenching circuit without altering the operation of the remainder of the circuit. The pulses developed across resistor 21 as a result of discharges in detector 15 are coupled to the control grid of tube 22 of a bistable multivibrator circuit 23 where the pulses are equalized as to width and amplitude. Potentiometer 24 is provided to adjust the input sensitivity of the multivibrator 23. The plate of the other tube 25 of multivibrator 23 is coupled to the cathode of tube 26 which is biased by a pair of resistors 27 and 28 connected between the high voltage source 29 and ground. Since the excursion of the plate of tube 25 is limited at one end by the regulated B+ voltage, in the present example, 150 volts, and on the other end by cathode follower 26, the negative output pulses, which may be of the order of 25 microseconds duration, have a predetermined constant amplitude, regardless of tube aging or variation in transconductance from one tube to the next. These negative pulses are coupled via capacitor 30 to counting-rate meter circuit 31, capacitor 30 being of a value so as to be fully charged within the period of each of the pulses. The left hand portion of double diode 32 is so connected that each pulse coupled to the circuit causes a definite amount of charge on capacitor 33 in a time short compared with the average spacing of the pulses. The charge on capacitor 33 leaks off through a high resistance including resistors 34 and 35, making the average potential across capacitor 33 proportional to the counting rate. The right hand side of tube 32 is biased slightly to improve the linearity of the circuit over its range of output voltage. If this bias is not present, a small current may flow through the diodes as the result of contact differences of potential and the finite velocity of emission of electrons from the cathodes of the diodes.

While the circuit thus far described is arranged to produce a negative potential across capacitor 33, it will be understood that if positive pulses are available from pulse shaping multivibrator 23, the diodes ensure that the correct amount of charge is transported to capacitor 33, and the output will be positive instead of negative.

Returning to the present circuit, a negative direct current voltage appears across the series combination of resistors 34 and 35 which is proportional to the counting rate of detector 15. Resistor 34 preferably is about ten times larger than resistor 35 so as to lower the impedance of the direct current signal, and the negative voltage is compared with an adjustable positive signal in a manner now to be described. A voltage divider comprising serially connected resistors 36, 37, 38 and 39 is connected between terminal 29 and ground, resistor 38 having an adjustable tap so as to obtain an adjustable positive direct current voltage. The lower end of resistor 35 is connected to the tap whereby the positive voltage signal is algebraically added to the negative signal appearing across resistor 35. At the preset liquid level, where a definite counting rate exists, potentiometer 38 is adjusted to a point to balance the negative voltage across resistor 35 so that the potential at the junction 40 of resistors 34 and 35 is equal to zero relative to the potential at the junction of resistors 38 and 39. Thus, if the liquid level falls relative to the preset level, resulting in an increased counting rate, a larger negative voltage appears across capacitor 33, and point 40 becomes negative, and likewise, when the counting rate decreases, point 40 becomes positive. The changes in the resultant signal from the present value are relatively small, however, and not capable of actuating available devices for controlling the level of the liquid in the vessel.

To achieve direction sensitive amplification of the deviations of the voltage at point 40, point 40 is connected via resistor 41 to one contact 42 of a vibrator or chopper, 43. Chopper 43 may be of a conventional type, for example, a Brown converter, including, in addition to contact 42, a second contact 44, and a contactor 45 adapted to be driven at a predetermined frequency, for example 60 cycles, from a source indicated at 46. Contactor 45 is connected to the junction of potentiometer 38 and resistor 39, whereby contacts 42 and 44 are alternately connected to a point of reference voltage determined by the relative sizes of resistors 36, 37, 38 and 39. By way of illustration, this voltage divider may be designed such that contactor 45 is at +5 volts relative to ground. Contactor 42 is connected via capacitor 47 to the control grid of the first tube 48 of a two-stage alternating current amplifier 49. The anode of tube 48 is capacitively coupled to the control grid of the second tube 50, the anode of which (for convenience designated as point 51) is connected via capacitor 52 to contactor 44 of the vibrator. While not essential to the operation of the circuit, contact 44 is connected to the junction of resistors 36 and 37 and to ground, through diodes 53 and 54, respectively, to limit the voltage applied to contactor 44. In the illustrated embodiment, the voltage divider is designed so that the junction of resistors 36 and 37 is 10 volts positive relative to ground.

It will of course be understood that if a source of negative voltage is available in the power supply used with the circuit, contactor 45 may be connected to ground, the cathode of diode 54 connected to a negative bias voltage, say −5 volts, and the anode of diode 53 connected to a point which is 5 volts positive, to achieve the same operating conditions.

As was earlier stated, at the preset liquid level, at which a definite counting rate is obtained, potentiometer 38 is so adjusted that no signal is applied across vibrator 43. As the liquid level in container 12 (Fig. 1) rises above the preset level, the counting rate decreases, reducing the amplitude of the negative potential developed across capacitor 33 and causing a positive direct voltage signal to be impressed across the vibrator. With the chopper in operation, contactor 45 connects contact 42 to the junction of potentiometer 38 and resistor 39, which in the illustrated example, is at a potential of +5 volts relative to ground, at a predetermined rate, for example, sixty times a second. Thus, it is seen that a rectangular voltage wave having a repetition rate equal to the period of vibrator 43 and a magnitude equal to the difference in potential between point 40 and contactor 45 is impressed on the control grid of tube 48 of amplifier 49. Amplifier 49 is preferably of high gain, approximately 4,000, and the output thereof, which is in phase with the input wave, is applied to the other contact 44 via capacitor 52.

To describe the action of the vibrator and the alternating current amplifier, assume that contact 42 is negative (corresponding to a liquid level below the preset level) and that contactor 45 is on contact 44. Under these conditions point 51 goes negative with respect to is quiescent value, while point 55 on the other side of capacitor 52 is at the positive voltage of the contactor 45, namely, +5 volts. With capacitor 52 charged in the foregoing manner, contactor 45 breaks contact with contact 44 and swings to make contact with contact 42, whereby the left plate of capacitor 47 has zero voltage with respect to contactor 45 impressed thereon which effectively raises the grid of tube 48. This signal is amplified, and because of the two stages of amplification, point 51 is raised above its previous value by an amount equal to the magnitude of the negative signal at point 40 times the gain of the amplifier 49. Now, since point 55 is no longer clamped by vibrator 43 to the +5 volt clamping potential of contactor 45, the positive rise of point 51 causes point 55 to go positive with respect to the +5 volt reference point. While this positive voltage may reach large values, it is limited to +10 volts by the conduction of diode 53 biased as previously desccribed. Such positive voltage is impressed on the circuit comprising resistor 56 and capacitor 57, the values of which are selected to provide a filtering action and to impress a substantially constant positive voltage, relative to the clamping voltage, on the control grid of tube 58. In the illustrated case, the resultant square wave at point 55 is clamped at its lower limit at +5 volts and limited in amplitude to +10 volts by diode 53 with the result that a +7.5 volt signal the average value of the clamped square wave, is impressed on the grid of tube 58.

If the liquid level rises above the preset level resulting in a positive signal between contact 42 and contactor 45 of the vibrator 43, the action of the vibrator results in a rectangular voltage at the input terminal of amplifier 49 which is 180° out of phase with the rectangular voltage produced at that point when the level is too low. From the previous description, it will be apparent that the square wave at point 55 will be 180° out of phase as well, causing it to vary between +5 volts and zero volts, the latter value being determined by diode 54. The average value of this square wave, which is filtered and applied to the grid of tube 58, consequently is +2.5 volts.

From the foregoing it is apparent that any variation in the potential at point 40 due to change in counting rate, which in turn, is dependent on liquid level, appears at point 55 as an amplified rectangular voltage wave having a phase dependent upon the polarity of point 40, and at the control grid of tube 58 as direct current signal of substantially larger magnitude than the variations at point 40. In other words, the combination of the vibrator and amplifier provides direction sensitive amplitude comparison between two direct current signals, through its modulation and demodulation action.

Tube 58 is preferably a pentode operated with low screen voltage so as to have sharp cut-off characteristics, and has a relay coil 59 connected in its plate circuit for controlling the relay 17 (Fig. 1) which controls the flow of liquid into the vessel. When the liquid level in the tank 12 drops only to the extent necessary to cause the potential at point 40 to become negative by less than a millivolt, the positive average voltage applied to the control grid of tube 58 (+7.5 volts) is sufficient to cause heavy conduction of tube 58 causing relay 17 to pick-up, opening valve 18, and supplying additional liquid to the container. Then as the liquid rises back to the preset level, a decrease in counting rate sufficient to cause the potential at point 40 to become positive by less than a millivolt results in an average voltage of +2.5 volts being applied to tube 58, which by virtue of the biasing network consisting of resistors 60, 61 and 62, is sufficient to cut off tube 58 with the result that relay 17 drops out and shuts off the supply of liquid. This means, in effect, that relay 59 will change its condition at almost exactly the same level whether the level of the liquid is rising or falling. Moreover, the level at which this change does occur does not depend on contact potential variations, changes in transconductance, or any other vacuum tube characteristics which cause direct current amplifiers to have objectionable long term drift. It will be noted also that the circuit is arranged so as to "fail safe" in the event of power failure; i. e., the relay will drop out indicating too high a liquid level, wherever the level may be, thus preventing overflow of the container.

With only slight modifications, the present circuit may readily be adapted to a number of gauge applications. Instead of installing the source and detector housings 10 and 14 in a fixed position and operating a relay when the level reaches the preset value, the source and detector circuit may be installed on vertical tracks on opposite sides of the container, as shown in Fig. 3, and driven up and down with changes in level by a motor suitably connected thereto. In the illustrated arrangement, a motor 65 is mounted at the top of the container for winding up and unwinding together, as with a winch 66, a pair of cables 67 and 68, secured to the source and detector housings, respectively. The motor 65 may be a two-phase motor, one phase energized from the 60 cycle source used to drive vibrator 43 in the circuit of Fig. 2, and the other energized from the square wave voltage appearing at point 55 (Fig. 2), suitably phase-corrected to overcome the lag introduced by the vibrator. When the alternating current output at point 55 is of one phase the motor rotates in one direction, and if on the opposite phase, in the opposite direction. Accordingly, the motor drives the source and detector along the track until the exact level of the liquid is located and the output at point 55 is reduced to zero, thus stopping the motor.

While there have been shown and described and pointed out the novel features of the invention as applied to a preferred embodiment, it will be understood that various omissions and substitutions and changes in the form and operation may be made by those skilled in the art without departing from the spirit of the invention. It is the intention, therefore, to be limited only as indicated by the scope of the following claims:

What is claimed is:

1. In a device for controlling the level of a liquid in a container including a source of radiation mounted adjacent an outer wall of said container at the desired level and a radiation detector mounted outside said container opposite said source, a control circuit comprising, means coupled to said detector for producing a direct current signal having a polarity relative to a reference voltage dependent on whether the level of the liquid is above or below said desired level, means for modulating said direct current signal to produce a periodic signal of one phase when said direct current signal is positive and of opposite phase when said direct current signal is negative relative to said reference voltage, means for amplifying said periodic signal and clamping the amplified signal at said reference voltage, and means responsive to the direct current component of said amplified and clamped periodic signal for controlling the supply of liquid to said container.

2. In a device for controlling the level of a liquid in a container including a source of radiation mounted adjacent an outer wall of said container at the desired level and a radiation detector mounted outside said container opposite said source, a control circuit comprising, means including a counting-rate meter circuit coupled to said detector for producing a direct current signal having a polarity relative to a reference voltage dependent on whether the level of the liquid is above or below said desired level, means for modulating said direct current signal to produce a periodic signal of one phase when said direct current signal is positive and of opposite phase when said direct current signal is negative relative to said reference voltage, means for amplifying said periodic signal and clamping the amplified signal at said reference voltage, and means responsive to the direct current component of said amplified and clamped periodic signal for controlling the supply of liquid to said container.

3. In a device for controlling the level of a liquid in a container including a source of radiation mounted adjacent an outer wall of said container at the desired level and a radiation detector mounted outside said container opposite said source, a control circuit comprising, a counting rate meter circuit coupled to said detector for producing a direct current signal proportional to the counting rate of said detector, means including a source of potential and a potentiometer arranged to oppose said direct current signal to provide a resultant signal which is equal to zero when the liquid is at said desired level, and which varies in polarity in response to increases and decreases in counting rate relative to the counting rate at said desired level, means for modulating said resultant current signal to produce a periodic signal of one phase when said resultant signal is positive and of opposite phase when said resultant current signal is negative, means for amplifying said periodic signal and clamping the amplified signal at a predetermined level, and means responsive to the direct current component of said amplified and clamped periodic signal for controlling the supply of liquid to said container.

4. In a device for controlling the level of a liquid in a container including a source of radiation mounted adjacent an outer wall of said container at the desired level and a radiation detector mounted outside said container opposite said source, a control circuit comprising, a counting-rate meter circuit coupled to said detector for producing a direct current signal proportional to the counting rate of said detector, means including a source of potential and a potentiometer arranged to oppose said direct current signal to provide a resultant signal which is equal to zero when the liquid is at said desired level, and which varies in polarity in response to increases and decreases in counting rate relative to the counting rate at said desired level, a vibrator having first and second contacts and a contactor adapted to be driven at a predetermined rate, means coupling said resultant signal to said first contact of said vibrator, an alternating current amplifier having input and output terminals, means connecting said first contact to the input terminal of said amplifier, and means including a capacitor connecting the output terminal of said amplifier to said second contact, said vibrator and amplifier being so phased as to modulate, amplify and clamp said resultant signal at a predetermined level to provide an output signal the direct current component of which has a polarity opposite to the polarity of said resultant signal, and means responsive to the direct current component of said periodic signal for controlling the supply of liquid to said container.

5. In a device for controlling the level of a liquid in a container including a source of radiation mounted adjacent an outer wall of said container at the desired level and a radiation detector mounted outside said container opposite said source, a control circuit comprising, a counting-rate meter circuit coupled to said detector for producing a direct current signal proportional to the counting rate of said detector, means including a source of potential and a potentiometer arranged to oppose said direct current signal to provide a resultant signal which is equal to zero relative to a point of reference voltage when the liquid is at said desired level, and which varies in polarity in response to increases and decreases in counting rate relative to the counting rate at said desired level, a vibrator having first and second contacts and a contactor connected to said point of reference voltage for alternately connecting said contacts to said point of reference voltage at a predetermined rate, means coupling said resultant signal to said first contact, a high gain, two-stage alternating current amplifier having input and output terminals, means capacitively connecting said first contact to the input terminal of said amplifier, means including a capacitor connecting said output terminal of said amplifier to said second contact, said vibrator and said amplifier being so phased as to modulate and amplify said resultant signal and to clamp the resulting periodic output signal at said reference voltage, said periodic output signal having a direct component the polarity of which, relative to said reference voltage, is opposite to the polarity of said resultant direct current signal, means for filtering the direct current component of said output signal, and an electronic tube having sharp cut-off characteristics connected to said filtering means for controlling the supply of liquid to said container.

6. In a device for controlling the level of a liquid in a container including a source of radiation mounted adjacent an outer wall of said container at the desired level and a radiation detector mounted outside said container opposite said source, a control circuit comprising, a counting-rate meter circuit coupled to said detector for producing a negative direct current voltage having a magnitude proportional to the counting rate of said detector, means including a source of positive voltage and an adjustable resistance network arranged to oppose said negative direct current voltage to provide a resultant signal which is equal to zero relative to a point of reference voltage at a preset liquid level and which becomes positive and negative, respectively, when the liquid level is above and below said preset level, a two stage alternating current amplifier having input and output terminals, means coupling said resultant signal to the input terminal of said amplifier, a vibrator having a first contact also connected to the input terminal of said amplifier, a second contact capacitively connected to the output terminal of said amplifier and a contactor connected to said point of reference voltage and vibrating between said contacts at a predetermined rate, and means connected to said second contact of said vibrator and responsive to the direct current component of the amplified periodic signal produced thereat for controlling the supply of liquid to said container.

7. Apparatus for indicating the level of a liquid in a container comprising, in combination, a source of radiation mounted adjacent an outer wall of said container and a radiation detector mounted outside said container opposite said source, means including a reversible motor for moving said source and detector together vertically along the outside wall of said container, means coupled to said detector for producing a direct current signal equal to zero relative to a point of reference voltage when said source and detector are at the liquid level and positive or negative depending on whether said source and detector are above or below the liquid level, means for modulating and amplifying said direct current signal to produce a periodic signal of one phase when said direct current signal is positive and of opposite phase when said direct current signal is negative, and means for applying said amplified periodic signal to said motor in such a direction that said motor drives said source and detector to maintain said direct current signal at zero value whereby the position of said source and detector indicates the level of the liquid.

8. Apparatus for indicating the level of a liquid in a container comprising, in combination, a source of radiation mounted adjacent an outer wall of said container and a radiation detector mounted outside said container opposite said source, means including a reversible motor for moving said source and detector together vertically along the outside wall of said container, a counting-rate meter circuit coupled to said detector for producing a direct current signal proportional to the counting rate of said detector, means including a source of potential and a potentiometer arranged to oppose said direct current signal to provide a resultant signal which is equal to zero relative to a point of reference voltage when the source and detector are at the liquid level, and which varies in polarity depending on whether said source and detector are above or below the liquid level, means for modulating and amplifying said resultant signal to produce a periodic signal of one phase when said resultant signal is positive and of opposite phase when said resultant signal is negative, and means for applying said amplified periodic signal to said motor in such a direction that said motor drives said source and detector in a direction to maintain said resultant signal at its zero value whereby the position of said source and detector indicates the level of the liquid.

9. Apparatus for indicating the level of a liquid in a container comprising, in combination, a source of radiation mounted adjacent an outer wall of said container and a radiation detector mounted outside said container opposite said source, means including a reversible motor for moving said source and detector together vertically along the outside wall of said container, a counting-rate meter circuit coupled to said detector for producing a direct current signal proportional to the counting rate of said detector, means including a source of potential and a potentiometer arranged to oppose said direct current signal to provide a resultant signal which is equal to zero relative to a point of reference voltage when the source and detector are opposite the liquid level and which varies in polarity depending on whether said source and detector are above or below the liquid level, a vibrator having first and second contacts and a contactor adapted to be driven at a predetermined rate, means coupling said resultant signal to the first contact of said vibrator, an alternating current amplifier having input and output terminals, means connecting said first contact to the input terminal of said amplifier, and means including a capacitor connecting the output terminal of said amplifier to said second contact, said vibrator and amplifier being so phased as to modulate and amplify said resultant signal to provide an amplified periodic output signal of one phase when said resultant signal is positive and of opposite phase when said resultant signal is negative, and means for applying said amplified periodic signal to said motor in such a direction that said motor drives said source and detector to maintain said direct current signal at its zero value whereby the position of said source and detector indicates the level of the liquid.

10. A circuit for producing an amplified direction-sensitive signal in response to small magnitude changes in polarity of a direct current signal relative to a point of reference voltage, comprising means for modulating said direct current signal to produce a periodic signal of one phase when said direct current signal is positive relative to said point of reference voltage and of opposite phase when said direct current signal is negative relative to said point of reference voltage, and means for amplifying said periodic signal and clamping the amplified signal at said reference voltage, the direct current component of said amplified and clamped periodic signal relative to said reference voltage being large compared to the departure of said direct current signal from said reference voltage.

11. A circuit for producing a large direction-sensitive signal in response to small amplitude changes in polarity of a direct current signal relative to a point of reference voltage, comprising a vibrator having first and second contacts and a contactor connected to said point of reference voltage and adapted to be driven at a predetermined rate, means coupling said direct current signal to said first contact, a high gain alternating current amplifier having input and output terminals, means capacitively coupling said first contact to the input terminal of said amplifier, and means capacitively coupling the output terminal of said amplifier to said second contact, said vibrator and said amplifier being so phased as to provide a periodic signal at said second contact having a direct current component relative to said reference voltage which is large compared to the departures of said direct current signal from said reference voltage.

12. A circuit for producing a large direction-sensitive indication of small amplitude changes in polarity of a direct current signal relative to a point of reference voltage, comprising a vibrator having first and second contacts and a contactor connected to said point of reference voltage, means coupling said direct current signal to said first contact, whereby said direct current signal is modulated at said predetermined rate, a two stage alternating current amplifier having input and output terminals, means coupling said modulated signal to the input terminal of said amplifier, and means including a capacitor connecting the output terminal of said amplifier to said second contact whereby an amplified modulated signal, clamped at said reference voltage, appears on said second contact, the direct current component of the signal on said second contact being of opposite polarity, relative to said reference voltage, and of greater amplitude than the departures of said direct current signal from said reference voltage.

13. In liquid level control apparatus including a source of radiation mounted adjacent an outer wall of a container and a radiation detector mounted horizontally opposite said source outside said container and arranged to intercept radiation transmitted through said container, a control circuit comprising, means coupled to said detector for producing a direct current signal of one polarity relative to a reference voltage if the level of the liquid in said container tends to fall below said source and of opposite polarity if the level of the liquid tends to rise above said source, means for modulating said direct current signal arranged to produce a periodic signal of one phase when said direct current signal is of said one polarity and of opposite phase when said direct current signal is of said opposite polarity, means for amplifying said periodic signal, and means operable in response to the output signal from said amplifying means arranged to maintain the liquid and said source at substantially the same level.

14. In liquid level control apparatus including a source of radiation mounted adjacent an outer wall of a vessel containing a liquid and a radiation detector mounted horizontally opposite said source outside said vessel and arranged to intercept radiation transmitted through said vessel, a control circuit comprising, means coupled to said detector for producing a direct current signal proportional to the counting rate of said detector, means including a source of potential and a potentiometer arranged to oppose said direct current signal to provide a resultant signal of zero value when the liquid is at a predetermined level relative to said source and detector and of one polarity when the liquid tends to fall below said predetermined level and of opposite polarity when said liquid tends to rise above said predetermined level, means for modulating said resultant signal to produce a periodic signal of one phase when said resultant signal is of said one polarity and of opposite phase when said resultant signal is of said opposite polarity, means for amplifying said periodic signal, and means operative in response to the output of said amplifying means arranged to maintain said predetermined relation between the level of the liquid and said source and detector.

References Cited in the file of this patent

UNITED STATES PATENTS

| 2,456,233 | Wolf | Dec. 14, 1948 |
| 2,613,326 | Herzog | Oct. 7, 1952 |